(12) United States Patent
Fedinatz

(10) Patent No.: US 6,293,544 B1
(45) Date of Patent: Sep. 25, 2001

(54) APPARATUS AND METHOD FOR REGISTERING AND CONVEYING A COMPILED SET OF SHEETS

(75) Inventor: George Fedinatz, Lakeville, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/470,235

(22) Filed: Dec. 22, 1999

(51) Int. Cl.$^7$ .................................................. B65G 15/14
(52) U.S. Cl. ...................... 271/243; 271/198; 198/626.5; 414/789; 414/790.3; 270/58.01
(58) Field of Search ............................... 270/58.01, 58.07, 270/58.08, 58.11, 58.12; 414/789.9, 790.2, 790.3; 271/31, 198, 243, 234, 236; 198/461, 577, 579, 620.5, 653, 654, 726

(56) References Cited

U.S. PATENT DOCUMENTS

| | | | |
|---|---|---|---|
| 3,897,053 | * | 7/1975 | Guy ....................................... 271/238 |
| 3,964,598 | * | 6/1976 | Alsop ................................ 271/243 X |
| 4,398,629 | * | 8/1983 | Williamson ........................... 198/479 |
| 4,502,592 | * | 3/1985 | Ramcke ................................ 198/627 |
| 4,541,764 | * | 9/1985 | Govan et al. ...................... 414/907 X |
| 4,575,296 | * | 3/1986 | Kocklet et al. ................. 270/58.12 X |
| 4,641,742 | * | 2/1987 | Igarashi et al. ....................... 198/627 |
| 4,989,854 | * | 2/1991 | McNamara .............................. 271/3.1 |
| 5,000,657 | * | 3/1991 | Gunther, Jr. ....................... 414/790.3 |
| 5,081,821 | * | 1/1992 | Meives .............................. 271/243 X |
| 5,484,255 | * | 1/1996 | Lowell .................................. 414/789 |
| 5,545,000 | * | 8/1996 | Gorsky .............................. 414/790.3 |
| 5,623,722 | * | 4/1997 | Hawley et al. ................ 270/58.01 X |

\* cited by examiner

*Primary Examiner*—Donald P. Walsh
*Assistant Examiner*—Patrick Mackey

(57) ABSTRACT

A sheet registration and conveyance apparatus for registering leading and trailing edges of a compiled set of sheets. The apparatus includes a first movable belt; a first registration stop fixedly mounted on the first belt for registering the leading edge of the sheets; a second movable belt, located next to the first belt; a second registration stop fixedly mounted on the second belt for registering the trailing edge of the sheets; a drive mechanism for moving the second belt relative to the first belt so that the second registration stop registers the trailing edge of the sheets after the first registration stop contacts the leading edge of sheets; and a mechanism for providing movement of the first belt synchronous with movement of the second belt after both the first and the second registration stops have registered the set of sheets.

20 Claims, 5 Drawing Sheets

APPARATUS AND METHOD FOR REGISTERING AND CONVEYING A COMPILED SET OF SHEETS

BACKGROUND OF THE INVENTION

Disclosed in the embodiments described in this application is an improved system for registering and conveying compiled sets of sheets.

In particular, there is disclosed an improved, low cost and simple system for compiling a set of documents in a registered manner and then conveying this compiled set toward an output station or toward any of various workstations for further finishing operations to be performed on the compiled set of documents.

Various types of registration and conveyance systems are known in the art. Many configurations in the Xerox DocuTech® family of multifunctional printers compile and register a set of documents in an output tray near the receiving mouth of the finisher apparatus. A gripper then squeezes and grabs a corner of the fully registered set and pulls the set along a conveyer toward the selected finishing station which may perform binding, stapling, or any similar finishing operation. Although this apparatus works well in most applications, it requires a complicated apparatus with a significant number of moving parts plus sensors to activate and deactivate the gripper apparatus with an appropriate amount of pressure that is sufficient to grip the compiled stack but not great enough to leave an imprint on the paper. In practice, a gripper-type mechanism limits the number of sheets that can be compiled since the gap between the gripper fingers effectively determines the depth of the pile that can be gripped.

It is also known in the art to compile and register a set of documents near the receiving mouth of a finishing apparatus and then to maintain the registration during conveyance by pushing the trailing edge of the compiled set by a registration stop or registration fingers located on a conveyance belt. Although relatively simple and without many moving parts, in an apparatus of this type, the top sheets of the compiled stack may fluff or otherwise slip out of registration. As a result, this type of conveyance apparatus also has an effective upper limit to the number of sheets that can effectively be conveyed in good registration.

It would be advantageous to have a reliable, low cost apparatus capable of reliably receiving a compiled stack of sheets and conveying the compiled sheets with good registration to the selected finishing station.

SUMMARY OF THE INVENTION

A specific feature of the specific embodiment(s) disclosed herein is to provide a sheet registration and conveyance apparatus for registering leading and trailing edges of a compiled set of sheets. The apparatus includes: a first movable belt; a first registration stop fixedly mounted on the first belt for registering the leading edge of the sheets; a second movable belt, located next to the first belt; a second registration stop fixedly mounted on the second belt for registering the trailing edge of the sheets; a drive mechanism for moving the second belt relative to the first belt so that the second registration stop registers the trailing edge of the sheets after the first registration stop contacts the leading edge of sheets; and a mechanism for providing movement of the first belt synchronous with movement of the second belt after the second registration stop registers the trailing edge of sheets.

Another aspect of the present invention is a printing machine having a registration and conveyance apparatus for registering leading and trailing edges of a compiled set of sheets. The registration and conveyance apparatus includes: a first movable belt; a first registration stop fixedly mounted on the first belt for registering the leading edge of the sheets; a second movable belt, located next to the first belt; a second registration stop fixedly mounted on the second belt for registering the trailing edge of the sheets; a drive mechanism moving the second belt relative to the first belt so that the second registration stop registers the trailing edge of the sheets after the first registration stop contacts the leading edge of sheets; and a mechanism for providing movement of the first belt synchronous with movement of the second belt after the second registration stop registers the trailing edge of the sheets.

Another aspect of the present invention is a method for registering leading and trailing edges of a compiled set of sheets and for conveying the compiled set of sheets. The method comprises: delivering the compiled set of sheets onto a first movable belt and in contact with a first registration stop fixedly mounted on the first movable belt; after delivery of the compiled set of sheets, moving a second movable belt that is located next to the first movable belt such that a second registration stop fixedly mounted on the second belt contacts the trailing edge of the compiled set of sheets; and, after contact is made between the second registration stop and the trailing edge of the compiled set of sheets, moving the first and the second belts synchronously.

BRIEF DESCRIPTION OF THE DRAWINGS

Other aspects of the present invention will become apparent as the following description proceeds and upon reference to the drawings, in which.

DETAILED DESCRIPTION OF THE DRAWINGS

While the present invention will hereinafter be described in connection with its preferred embodiments and methods of use, it will be understood that it is not intended to limit the invention to these embodiments and method of use. On the contrary, the following description is intended to cover all alternatives, modifications, and equivalents, as may be included within the spirit and scope of the invention as defined by the appended claims.

As an exemplary application of the present invention, its application within an electrophotographic print engine will herein be described. In as much as the art of electrophotographic printing is well known, the various process stations employed in the FIG. 3 printing machine will be shown hereinafter schematically and their operation described briefly with reference thereto.

Figure 3:
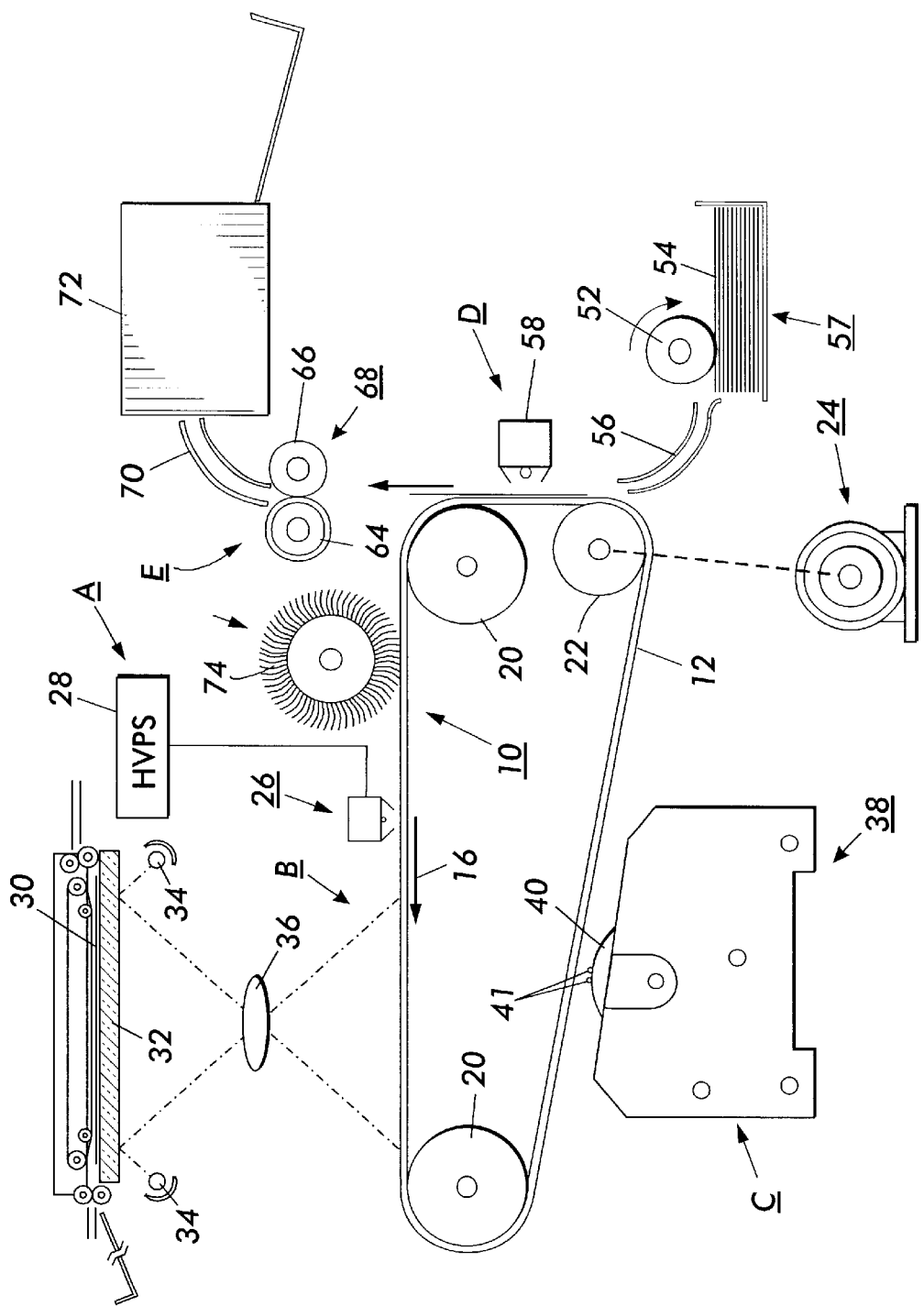
FIG. 3 is a schematic elevational view of an exemplary electrophotographic printing machine incorporating the sheet registration and conveyance apparatus of the present invention.

FIG. 3 shows an illustrative electrophotographic printing machine incorporating the apparatus of the present invention. The printing machine incorporates a photoreceptor 10 in the form of a belt having a photoconductive surface layer 12 on an electroconductive substrate 14. Preferably the surface 12 is made from a selenium alloy. The substrate 14 is preferably made from an aluminum alloy which is electrically grounded. The belt is driven by means of motor 24 along a path defined by rollers 18, 20 and 22, the direction of movement being counter-clockwise as viewed and as shown by arrow 16. Initially a portion of the belt 10 passes through a charge station A at which a corona generator 26 charges surface 12 to a relatively high, substantially uniform, potential. A high voltage power supply 28 is coupled to device 26. After charging, the charged area of surface 12 is passed to exposure station B. At exposure station B, an original document 30 is placed face down upon a transparent platen 32. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 which corresponds to the informational areas contained within original document 30. After the electrostatic latent image has been recorded on photoconductive surface 12, belt 10 advances the latent image to development station C. At development station C, a development system, develops the latent image recorded on the photoconductive surface. Preferably, development system includes a donor roller 40 and electrode wires positioned in the gap between the donor roll and photoconductive belt. Electrode wires 41 are electrically biased relative to donor roll 40 to detach toner therefrom so as to form a toner powder cloud in the gap between the donor roll and photoconductive surface. The latent image attracts toner particles from the toner powder cloud forming a toner powder image thereon. Donor roll 40 is mounted, at least partially, in the chamber of developer housing 38. The chamber in developer housing 38 stores a supply of developer material. The developer material is a two component developer material of at least magnetic carrier granules having toner particles adhering triboelectrically thereto. A transport roller disposed interiorly of the chamber of housing 38 conveys the developer material to the donor roller. The transport roller is electrically biased relative to the donor roller so that the toner particles are attracted from the transport roller to the donor roller. After the electrostatic latent image has been developed, belt 10 advances the developed image to transfer station D, at which a copy substrate 54 is advanced from substrate tray 57 by roll 52 and guides 56 into contact with the developed image on belt 10. A corona generator 58 is used to spray ions on to the back of the substrate so as to attract the toner image from belt 10 to the substrate. As the belt 10 turns around roller 18, the copy substrate 54 is stripped therefrom with the toner image thereon. After transfer, the copy substrate is advanced by a conveyor (not shown) to fusing station E. Fusing station E includes a heated fuser roller 64 and a back-up roller 66. The substrate passes between fuser roller 64 and back-up roller 66 with the toner powder image contacting fuser roller 64. In this way, the toner powder image is permanently affixed to the substrate. After fusing, the substrate advances through chute 70 to the mouth of finishing apparatus 72 which contains the apparatus of the present invention. After the substrate is separated from photoconductive surface 12 of belt 10, the residual toner particles adhering to photoconductive surface 12 are removed therefrom by a rotatably mounted fibrous brush 74 in contact with photoconductive surface 12. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of a printing machine incorporating the finishing apparatus of the present invention therein. Although the apparatus of the present invention is particularly well adapted for use in an electrophotographic reproducing machine as shown in FIG. 3, it will become apparent from the following discussion that the finishing apparatus of the present invention is equally well suited for use in a wide variety of printers and other document handling systems where conveyance of compiled sheets is advantageous.

The disclosed system described above and of the present invention may be operated and controlled by appropriate operation of conventional control systems. It is well known and preferable to program and execute imaging, printing, paper handling, and other control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from functional descriptions such as those provided herein, and/or prior knowledge of functions which are conventional, together with general knowledge in the software or computer arts. Alternatively, the disclosed control system or method may be implemented partially or fully in hardware, using standard logic circuits or single chip VLSI designs.

The term "printer" as used herein broadly encompasses various printers, copiers or multifunction machines or systems, xerographic or otherwise, unless otherwise defined in a claim. The term "imaging system" as used herein broadly encompasses printers, scanners and other systems that handle, input, create, or print images. The term "sheet" herein refers to a usually flimsy physical sheet of paper, plastic, or other suitable physical substrate for imaging.

Figure 1A:
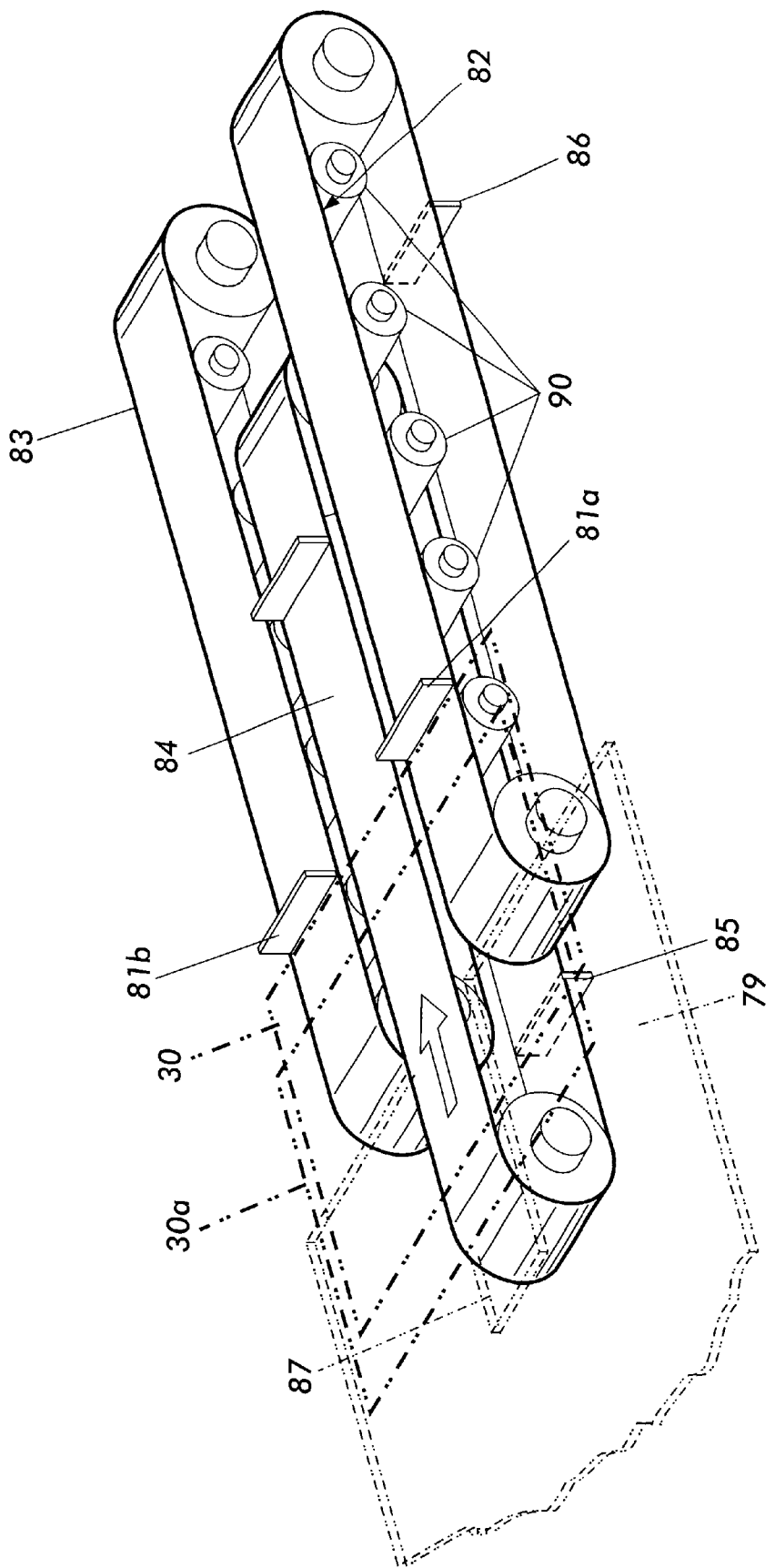
FIG. 1a is a perspective view of the apparatus of the lower portion of the present invention in a first position.
Figure 1B:
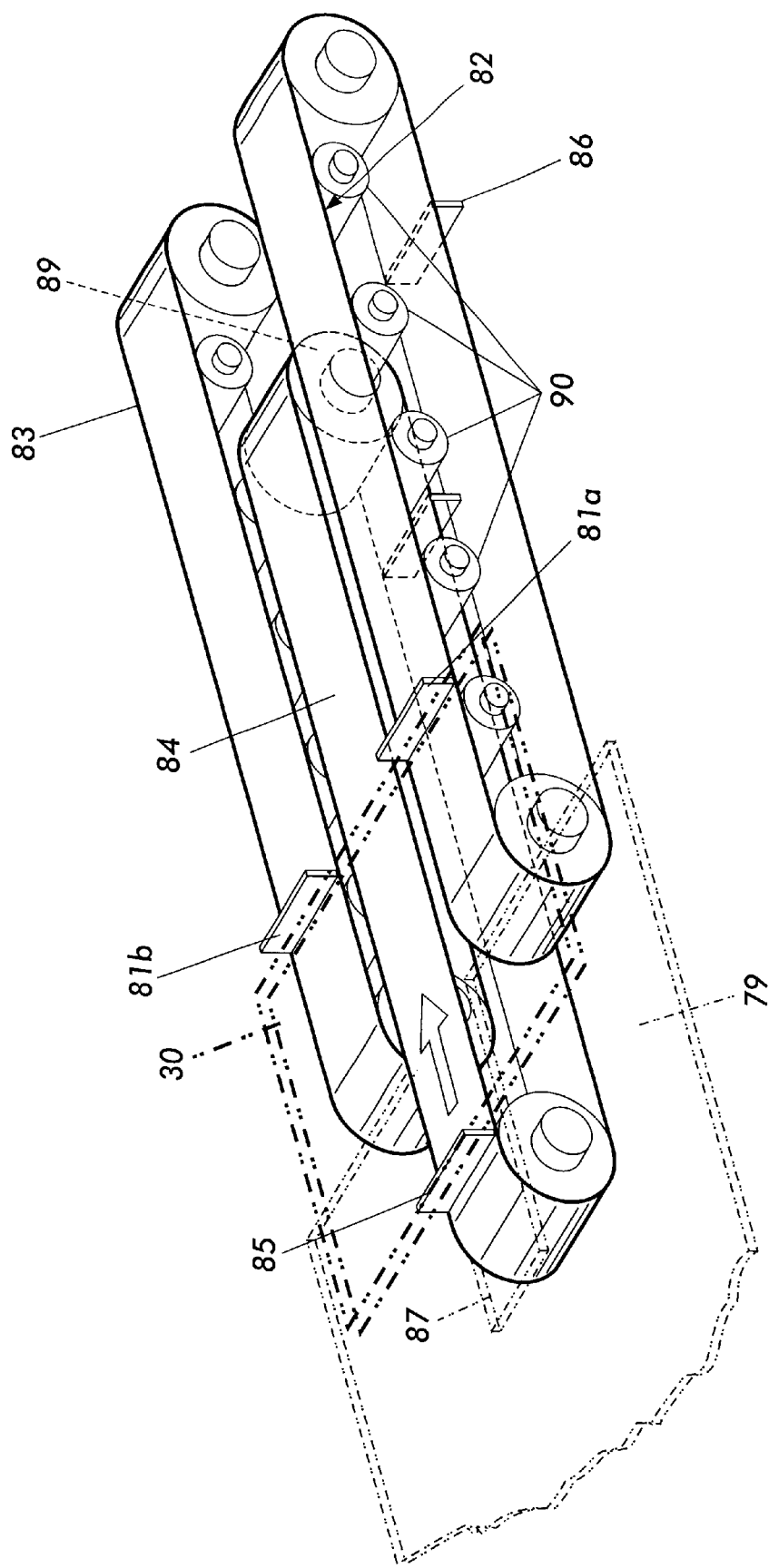
FIG. 1b is a perspective view of the apparatus of the lower portion of the present invention after it has moved into a second position.
Figure 1C:
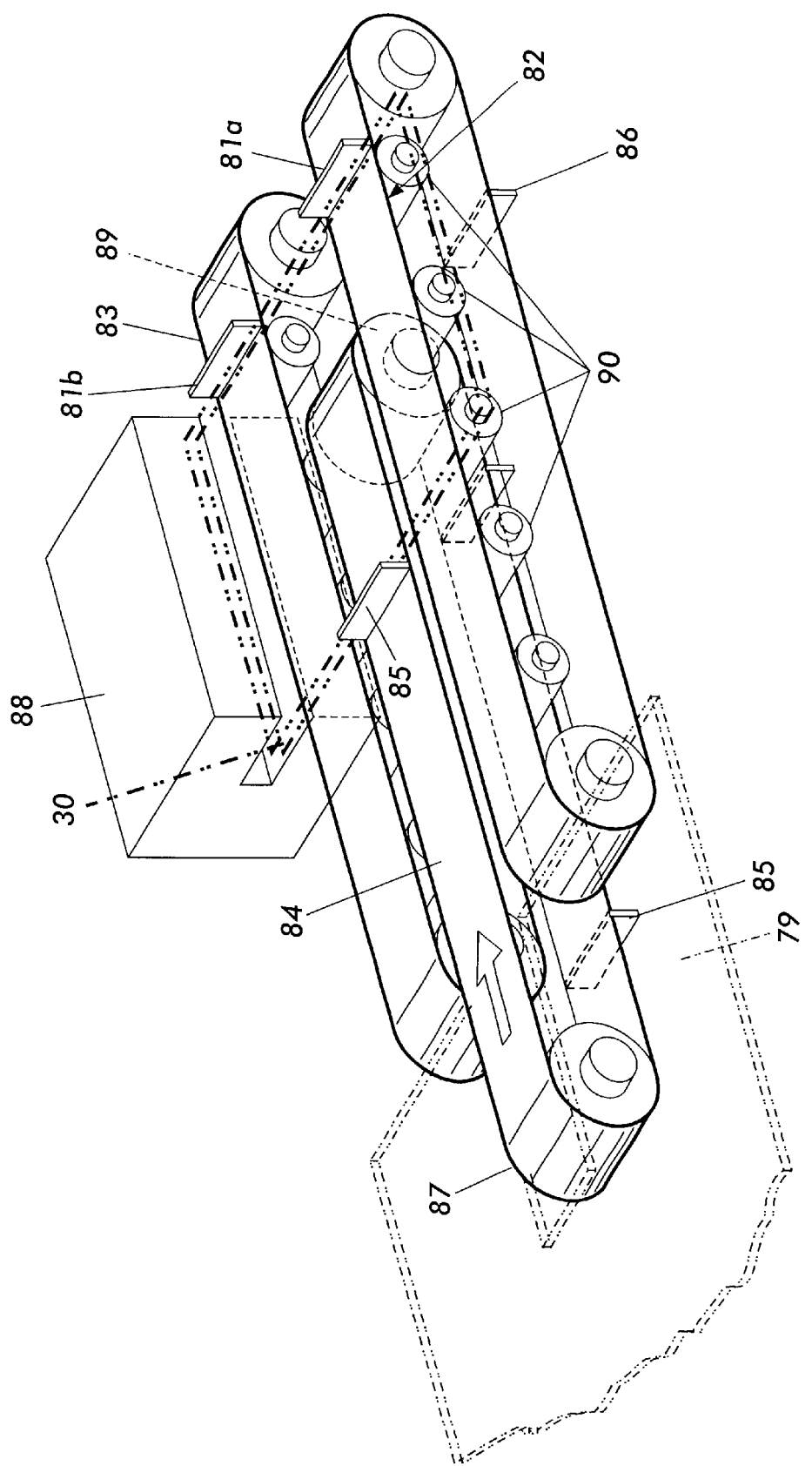
FIG. 1c is a perspective view of the apparatus of the lower portion of the present invention after it has moved into a third position.

Moving now to the particular features of the finishing apparatus 72 of the present invention, reference is made to FIGS. 1a, 1b, and 1c wherein the lower portion of the registration and conveyance apparatus of the present invention is shown in a sequence of three positions. In the first position as shown in FIG. 1a, document 30a is being delivered onto a stack of sheets 30 being compiled on the surface of delivery tray 79. Forward motion of sheet 30a and of all previously delivered sheets 30 is stopped by registration stops 81a and 81b which are fixedly mounted on lower endless belts 82 and 83. In this manner, stops 81a and 81b serve to provide leading edge registration for compiled sheets 30. Belts 82 and 83 are mounted in parallel fashion on either side of center endless belt 84. The end of center belt 84 which receives sheets 30 is located partially under tray 79. This end portion of center belt 84 emerges from under tray 79 through slot 87. Compiled sheets 30 are delivered onto this end portion of center belt 84 such that both this end portion of belt 84 and the compiled sheets 30 are supported by tray 79. Center belt 84 is shown with two fixedly mounted registration stops, 85 and 86. In FIG. 1a, neither of stops 85 and 86 are positioned to engage sheets 30. In particular, stop 85 is shown below tray 79, and center belt 84 remains stopped in this position until all of sheets 30a have been delivered onto tray 79. In sum, FIG. 1a shows sheets 30 being compiled with lead edge registration being provided by stops 81*a* and 81*b*.

Turning now to FIG. 1*b*, a second position of the apparatus of the present invention is shown. Belts 82 and 83, together with their stops 81*a* and 81*b*, have not moved. A complete set of sheets 30 has been delivered and compiled with lead registration being provided by stops 81*a* and 81*b*. Center belt 84 has rotated, however, such that registration stop 85 moved through slot 87 and now registers the trailing edge of compiled sheets 30. Preferably, registration stop 85 contacts the trailing edge of sheets 30. However, a position in which registration stop 85 is in close proximity to the trailing edge of sheet 30 is sufficient. Motion of the second belt 84 relative to belts 82 and 83 is stopped once registration stop 85 arrives at its registration position. This stoppage may be computer activated from the controller based on information received from the imaging system relating to the known size of the sheets 30. Alternatively, as contact is made with the trailing edge, the force driving belt 84 imparts a force through compiled sheets 30 onto registration stops 81*a* and 81*b*. By virtue of a slip clutch mechanism or pressure switch (not shown), the lateral force exerted onto stops 81*a* and 81*b* activate the drive motors (not shown) of belts 82 and 83. Alternatively, the resistance upon stop 85 encountered upon contact with the trailing edge of sheets 30 triggers release of a spring-loaded or hydraulic clutch mechanism which locks belts 82 and 83 to belt 84. Whether belts 82 and 83 are driven by motors separate from belt 84 or whether belts 82 and 83 become coupled to belt 84, movement of the three belts becomes synchronous once registration stop 85 nudges against the trailing edge of compiled sheets 30.

FIG. 1*c* shows belts 82, 83, and 84 having moved synchronously toward a finishing station 88. Stops 85, 81*a* and 81*b* have as a result also moved synchronously, and compiled sheets 30 have been successfully conveyed in good registration from the tray 79 to one or more stations where finishing operations can be performed. In the embodiment as shown, a side portion of compiled sheets 30 overhangs belt 83 in order to be accessible for stapling, binding, or other finishing operations by finishing station 88. Not shown is a fixed support tray that supports the middle section of compiled sheets 30 between belts 82 and 83 after belt 84 has reached its end roller 89. Although only one finishing station is shown, it will be understood that any number of finishing operations may be positioned sequentially. A system controller (not shown) operates the apparatus such that conveying belts 82, 83, and 84 are braked at the appropriate finishing station 88. Once finishing operations are complete, compiled sheets 30 can either be advanced to the end of belts 82 and 83 or may be pulled or pushed laterally off the conveyance system at the desired location.

As shown in FIGS. 1*a*, 1*b*, and 1*c*, belts 82 and 83 are supported by a series of support rollers 90. It will be understood that support of belts 82 and 83 may be accomplished by a fixedly mounted tray, especially one with a low co-efficient of friction in order to minimize wear on the belt and in order not to interfere with the clutch/switch mechanism that synchronizes movement of belts 82 and 83 to movement of belt 84 once registration stop 85 is nudged against the trailing edge of compiled sheets 30.

Once compiled sheets 30 have been removed from the belts, the clutch or motor mechanism that has held belt 84 in synchronous movement with belts 82 and 83 is released. As shown in FIGS. 1*a*, 1*b*, and 1*c*, another set of registration stops 81*a* and 81*b* is positioned on belts 82 and 83 to receive another set of compiled sheets. To ensure that another set of compiled sheets can be received without interference from registration stop 85, the spacing between registration stops on belt 84 is greater than the spacing between registration stops on belts 82 and 83. Alternatively, belt 84 can be advanced such that its next registration stop is in proper position once belt 84 has been decoupled from belts 82 and 83.

In one embodiment of the invention, only one set of compiled sheets 30 is placed and conveyed on the apparatus at any one time. The embodiment shown in FIGS. 1*a*, 1*b*, and 1*c* shows 2 sets of registration stops on each belt configured such that only one compiled is handled at a time. Those familiar with the art will recognize that many sets of registration stops may be mounted on each belt as long as sufficient space is provided between each stop for the compiling of sheets 30 to occur as shown in FIG. 1*a* and as long as sufficient space is provided for each of the finishing stations that may perform operations on the compiled sheets. For embodiments configured to convey multiple sets of compiled sheets simultaneously, the spacing between the registration stops and between each of the finishing stations are coordinated such that when the belts are braked for a finishing operation, a set of registration stops 81*a* and 81*b* is positioned near tray 79 to receive new sheets 30*a*. As described above, the spacing between registration stops on belt 84 would be greater than the spacing on belts 82 and 83 in order that a first compiled set 30 can be confined at its leading and trailing edges by registration stops during conveyance and finishing while sufficient spacing is provided between a second set of stops 81*a* and 81*b* at tray 79 to receive the new sheets 30*a* without interference from trailing edge stop 85. In a configuration that handles multiple sets of compiled sheets, the conveyance system operates such that the belts are stationary during the processing of a finishing operation and during delivery of sheets 30*a* onto delivery tray 79. Once the finishing and delivery operations are complete, then registration stop 85 moves forward to nudge the trailing edge of the newly delivered compiled set in the same manner as described above. The process then repeats itself for each of the compiled sets.

Figure 2:
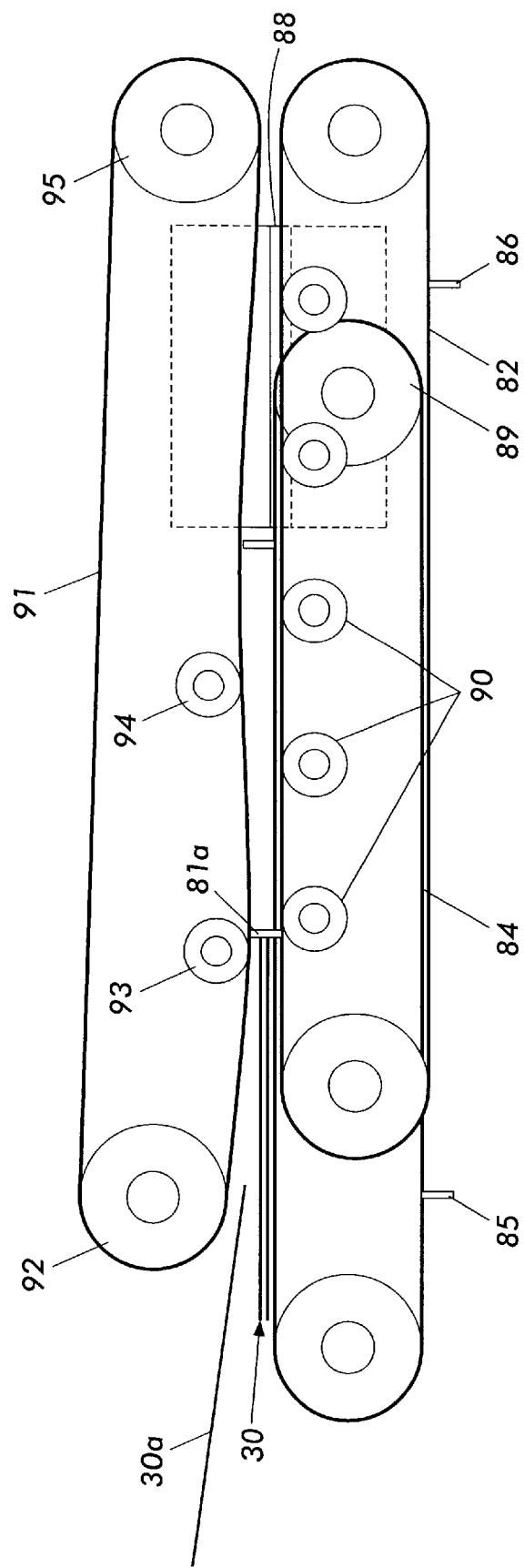
FIG. 2 is a schematic elevational view of the apparatus of the present invention.

Referring now to FIG. 2, a schematic elevational view is shown of another embodiment of the present invention wherein confinement belt 91 is added to the apparatus described above. As shown, belt 82, belt 84, registration stops 85 and 81*a*, compiled sheets 30, and rollers 89 and 90 are positioned and function as described above. Belt 83 and registration stop 81*b* are not shown but are present as described above. Confinement belt 91 serves to prevent sheets 30 from buckling out of registration once compiled and confined by stops 81*a*, 81*b*, and 85. As shown, confinement belt 91 is positioned by rollers 92 and 93 to be spaced sufficiently above tray 79 that delivered sheets 30*a* enter below belt 91 without interference. The bottom side of belt 91 may also serve as a baffle to help direct delivered sheet 30*a* to its proper registered position against stops 81*a* and 81*b*. Once belt 84 begins to move, belt 91 also moves synchronously and is lowered into contact with stops 81*a*, 81*b*, and 84 by rollers 94 and 95. Confinement belt 91 then continues to move synchronously with each of belts 84, 82, and 83 to confirm the top side of the compiled sheets such that each set of compiled sheets 30 is confined on the top, bottom, front and rear. As shown, confinement belt 91 follows a path that raises it above belts 84, 82 and 83 after the finishing operations at station 88 are complete.

In review, there is disclosed a sheet registration and conveyance apparatus that includes a system of parallel lower belts that each contain registration stops. Sheets to be compiled are delivered onto the belts with leading edge registration being provided by contacting a first set of stops. Upon delivery of a complete set of sheets, at least one registration stop from a second belt moves forward to nudge the trailing edge of the compiled set. The lower belts together with their fixedly mounted registration stops then move synchronously toward the applicable finishing stations, with the stops providing both leading and trailing edge registration and confinement. In another embodiment of the invention, a top belt is provided to provide further confinement to the top of each compiled set of sheets.

It is, therefore, evident that there has been provided in accordance with the present invention embodiments and methods that fully satisfy the aims and advantages set forth above. While the invention has been described in conjunction with several embodiments, it is evident that many alternatives, modifications, and variations will be apparent to those skilled in the art. Accordingly, it is intended to embrace all such alternatives, modification, and variations as fall within the spirit and broad scope of the following claims.

What is claimed is:

1. A sheet registration and conveyance apparatus for registering leading and trailing edges of a compiled set of sheets, comprising:
   a. a first movable belt;
   b. a first registration stop fixedly mounted on the first belt for registering the leading edge of the sheets;
   b. a second movable belt;
   d. a second registration stop fixedly mounted on the second belt for registering the trailing edge of the sheets;
   e. a drive mechanism for moving the second belt relative to the first belt so that the second registration stop registers the trailing edge of the sheets after the first registration stop contacts the leading edge of the sheets; and
   f. a mechanism for providing movement of the first belt synchronous with movement of the second belt after the second registration stop registers the trailing edge of the sheets.

2. The apparatus of claim 1, wherein the first belt comprises two parallel belts with the second belt being interposed therebetween.

3. The apparatus of claim 1, wherein the first registration stop comprises a plurality of leading edge registration stops fixedly mounted and spaced apart on the first belt.

4. The apparatus of claim 1, wherein the second registration stop comprises a plurality of trailing edge registration stops fixedly mounted and spaced apart on the second belt.

5. The apparatus of claim 3, wherein the second registration stop comprises a plurality of trailing edge registration stops fixedly mounted and spaced apart on the second belt and wherein the spaces between the second registration stops is greater than the spaces between the first registration stops.

6. The apparatus of claim 1, further comprising at least one finishing station for performing at least one finishing operation on the compiled set of sheets once movement of the first and second belts delivers the compiled set of sheets to the finishing station.

7. The apparatus of claim 6, wherein the apparatus is configured such that at least one finishing operation is being performed on a first compiled set of sheets while a second set of sheets is being compiled at the first registration stop.

8. The apparatus of claim 6, wherein the mechanism for providing movement of the first belt synchronous with movement of the second belt ceases to provide synchronous movement after the sheets are delivered to the finishing station.

9. The apparatus of claim 1, further comprising a movable upper confinement belt which, when the second belt is moving, moves synchronously with the second belt and which confines the top side of the set of sheets.

10. The apparatus of claim 1, wherein the mechanism for providing movement of the first belt synchronous with movement of the second belt comprises a mechanism to couple the first belt to the second belt such that the first belt is moved by a force imparted from a force operating on the second belt.

11. The apparatus of claim 1, further comprising a controller which directs activation of the mechanism for providing synchronous movement of the first and the second belts when the controller determines that the second registration stop is in a position that registers the trailing edge of the sheets.

12. A printing machine including a sheet registration and conveyance apparatus for registering leading and trailing edges of a compiled set of sheets, comprising:
   a. a first movable belt;
   b. a first registration stop fixedly mounted on the first belt for registering the leading edge of the sheets;
   b. a second movable belt, located next to the first belt;
   d. a second registration stop fixedly mounted on the second belt for registering the trailing edge of the sheets;
   e. a drive mechanism for moving the second belt relative to the first belt so that the second registration stop registers the trailing edge of the sheets after the first registration stop contacts the leading edge of the sheets; and
   f. a mechanism for providing movement of the first belt synchronous with movement of the second belt after the second registration stop registers the trailing edge of the sheets.

13. A method for registering leading and trailing edges of a compiled set of sheets and for conveying the compiled set of sheets, comprising:
   a. delivering the compiled set of sheets onto a first movable belt and in contact with a first registration stop fixedly mounted on the first movable belt;
   b. after delivery of the compiled set of sheets, moving a second movable belt such that a second registration stop fixedly mounted on the second belt registers the trailing edge of the compiled set of sheets; and
   c. after contact is made between the second registration stop and the trailing edge of the compiled set of sheets, moving the first and the second belts synchronously.

14. The method of claim 13, further comprising the step of moving an upper confinement belt synchronously with movement of the second belt.

15. The method of claim 13, further comprising the step of stopping synchronous movement of the first and second belt when the compiled set of sheets is delivered to a finishing station.

16. The method of claim 13, further comprising the step of performing at least one finishing operation upon the compiled set of sheets.

17. The method of claim 16, wherein the step of performing at least one finishing operation on a first compiled set of sheets is performed simultaneously with the step of compiling a second set of sheets at the first registration stop.

18. The method of claim 13, wherein the step of moving the first and second step synchronously comprises coupling the first and the second belts together.

19. The method of claim 13, further comprising determining, by a controller, when the second registration stop has registered the trailing edge of the compiled set of sheets.

20. The method of claim 13, further comprising moving an upper confinement belt synchronously with movement of the second belt.

* * * * *